Dec. 12, 1967     G. E. CONKLIN ET AL     3,358,148
HAZE MEASURING APPARATUS WITH SOLID BLOCK WITH CAVITY
Filed Jan. 29, 1963     3 Sheets-Sheet 1

GEORGE E. CONKLIN     INVENTORS
JOHN J. HEIGL

BY W. O. Heilman

PATENT ATTORNEY

Dec. 12, 1967  G. E. CONKLIN ETAL  3,358,148
HAZE MEASURING APPARATUS WITH SOLID BLOCK WITH CAVITY
Filed Jan. 29, 1963  3 Sheets-Sheet 3

GEORGE E. CONKLIN
JOHN J. HEIGL  INVENTORS

BY *W.O.J Heilman*

PATENT ATTORNEY

United States Patent Office 3,358,148
Patented Dec. 12, 1967

3,358,148
HAZE MEASURING APPARATUS WITH SOLID BLOCK WITH CAVITY
George E. Conklin, North Plainfield, and John J. Heigl, Short Hills, N.J., assignors to Esso Research and Engineering Company, a corporation of Delaware
Filed Jan. 29, 1963, Ser. No. 254,687
8 Claims. (Cl. 250—218)

This invention relates to a technique for measuring haze in materials (by means external to said materials) and apparatus suitable for effecting such measuring. In particular, the invention relates to a method and apparatus for measuring haze in materials by simultaneously comparing the intensity of directly transmitted radiant energy received through such materials with the intensity of radiant energy received through said materials which has been transmitted through such materials by scattering from particles within said materials capable of causing haze.

The method and apparatus described herein are suitable for use for determination on any material capable of transmitting radiant energy. However, it is particularly applicable to fluid compositions, e.g. liquids and gases. The method and apparatus are eminently useful in the quality control of a wide variety of industrial products, for instance, those in the chemical process industries including fuel oils, lubricating oils, hydraulic fluids, aqueous compositions and the like. They are also useful in the quality control of edible products, for instance, cooking oils, beverages (especially fermented products), etc. Moreover, said apparatus and technique are useful for determining cloud points of various materials at any temperature.

The apparatus and technique of the invention are particularly well adapted for use in actual flow conditions although static type samples can also be analyzed.

A copending application, S.N. 135,574, filed Sept. 1, 1961, now Patent No. 3,202,826 and having the same assignee as the present case, discloses that by comparing the intensity of a beam of radiant energy received by direct transmission through a medium with the intensity of radiant energy received which is caused by scattering from haze-causing particles in the same medium, a measure of relative visual haze can be obtained. Furthermore, a common radiant energy source can be utilized for both the direct transmission and the scattering. However, the methods disclosed in the above application and those previously known to the art for determining haze all require bulky apparatus and cumbersome procedures. They also require that at least part of the testing equipment be immersed into the sample material thereby setting a rather large minimal sample size for functionability.

It has now been discovered that haze or turbidity within a material can be measured by radiant energy, e.g. photoelectrical means completely external but adjacent to the sample material. The apparatus of a preferred embodiment is quite simple and rugged. It is easily adapted to the testing of either very small, discrete samples or to the continuous monitoring of large volume industrial process streams. Such an apparatus can be further adapted to actuate either indicating or recording instruments of the electromechanical type to provide a visual measure of the relative severity of haze. The method and apparatus of the invention will measure haze satisfactorily in materials of any color and also in materials which are so dark that conventional haze measuring techniques cannot be satisfactorily utilized.

In preferred form, the apparatus comprises a metal block, e.g. brass, and preferably cylindrical having a hollow center portion. There are three orifices connecting the center of the block to the exterior of the block. Attached rigidly to this metal block at the orifices are a light source and two photoelements. The light source and one of the photoelements are so arranged in diametrically opposed positions that the photoelement can directly see the light from the light source. A second photoelement is offset at an angle $\alpha$ with reference to the light beam so that it will see substantially no transmitted light from the light source. A sample tube extends through the hollow center of the metal block.

The light source, photoelements and sample tube are rigidly sealed to the block by compression fittings which are used to prevent oil or moisture from entering any of the orifices. Said orifices are located in the block between the sample tube and both the photoelements and the light source. All the inner surfaces of the apparatus are prepared so as to be nonreflecting either by painting or by chemically treating. Preferably, the internal surfaces of the block are oxidized.

The two photoelements are preferably photoelectric cells of the variable resistance type and are connected with electrical wires to a bridge circuit potentiometer which, in turn, can be connected electrically to an automatic recorder. Because of the angle offset $\alpha$ and the fine ray-like nature of the light beam produced by the small diameter, e.g. .040″–.080″, preferably about .060″, of the orifice between the light source and the sample tube, one of the photoelectric cells can only see light when there are haze-causing particles present. This is because the more haze-causing particles there are, the more scattering there is and the more light that can be seen by the offset or scatter photocell. Also, when there is an increase in haze-causing particles, the transmittance photocell (located diametrically opposite the light source) sees proportionately less light. Since the resistances of the two photoelectric cells are cooperatively connected to a potentiometer, the potentiometer reading is a direct measure of relative visual haze.

The invention will be further understood by reference to the accompanying drawings which represent a preferred form of the invention.

Figure 1:
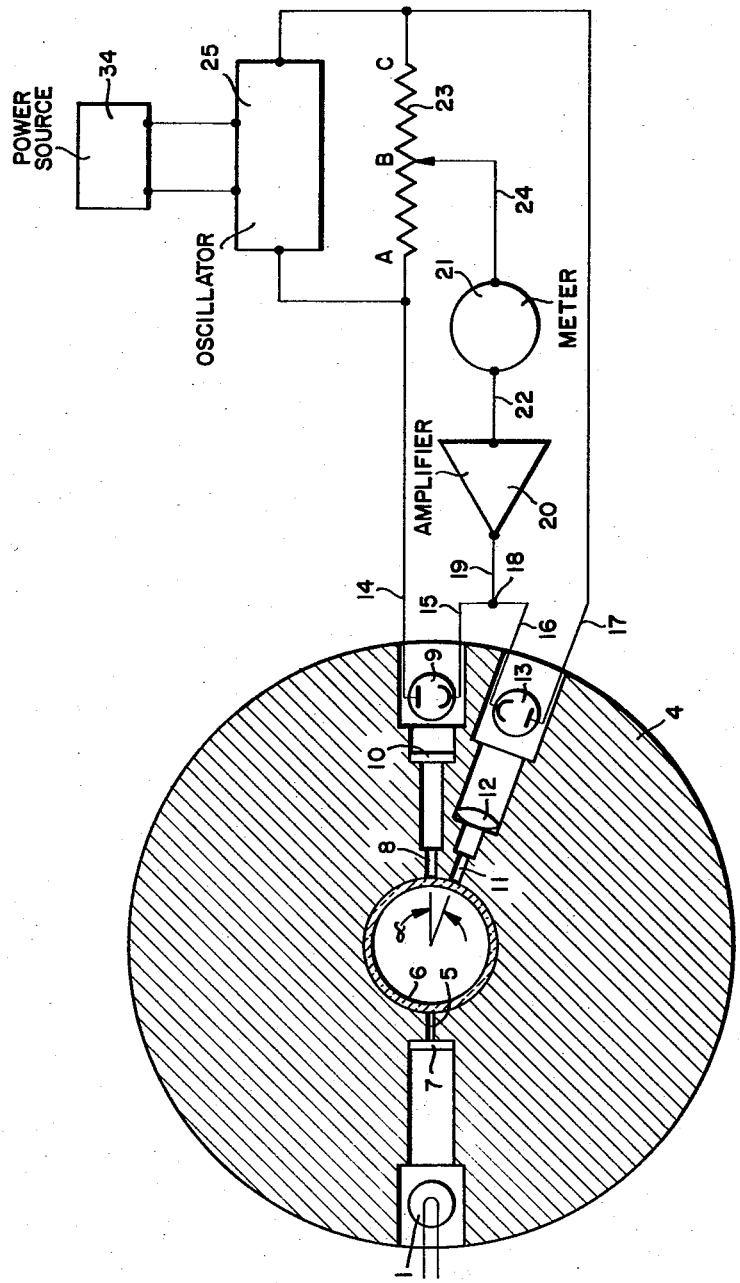
FIG. 1 is a schematic representation of a preferred embodiment of the haze measuring apparatus of the invention.

Reference is now made to the drawings in detail. In FIG. 1, a schematic representation of the haze measuring system is shown. Light source 1 is rigidly mounted in metal block 4. Orifice 5 allows light to pass from source 1 to transparent sample tube 6. Filter 7 is installed between the light source 1 and orifice 5. Diametrically opposed to orifice 5 is orifice 8 which allows light to pass from sample tube 6 to a transmittance photocell 9 rigidly mounted in block 4. Filter 10 may be installed between orifice 8 and photocell 9. Orifice 11 is located at a fixed angle $\alpha$ from orifice 8 and allows light to pass from sample tube 6 through lens 12 to scatter photocell 13. Photocell 9 is attached to insulated electrical conductors 14 and 15. Photocell 13 is attached to insulated electrical conductors 16 and 17. Insulated electrical conductors 15 and 16 are connected at a point 18 with insulated electrical conductor 19 which in turn is connected to amplifier 20. An ammeter 21 is connected to amplifier 20 by insulated electrical conductor 22 and to potentiometer 23 by insulated electrical conductor 24, conductor 24 being attached to the slider of potentiometer 23. Potentiometer 23 is connected to conductors 14 and 17 in parallel circuit and an oscillator 25, preferably transistorized, is attached to the ends of conductors 14 and 17 to complete the circuit and to provide A.C. excitation of the circuit. In this manner photocells 9 and 13 have been connected to form two legs of a Wheatstone bridge circuit. The power for the oscillator and the bridge circuit is provided by power source 34, preferably a dual 12 volt Zener controlled power supply.

Figure 2:
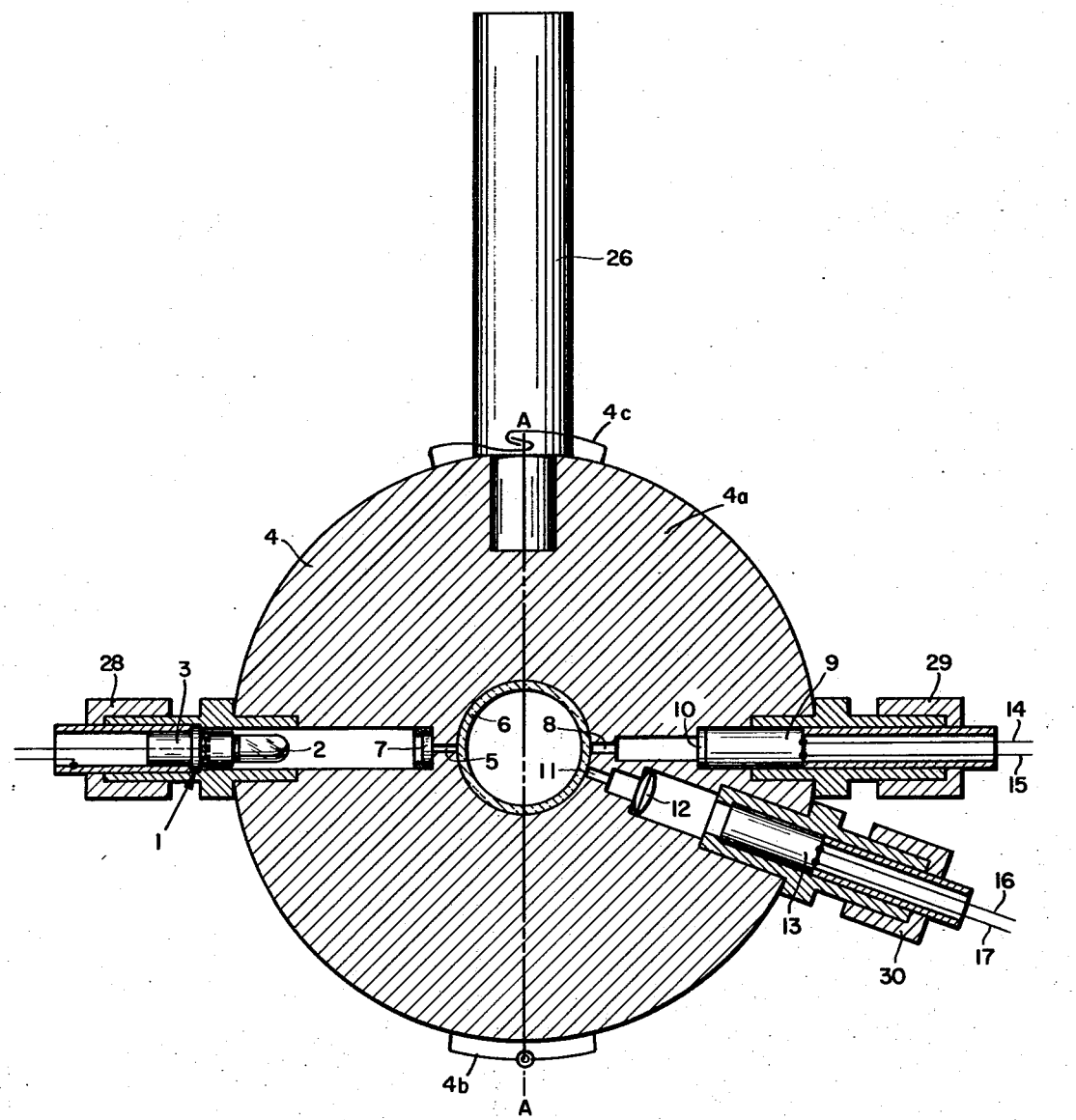
FIG. 2 is a view taken in horizontal cross section of a preferred embodiment of the haze apparatus sensor block.

Turning to FIG. 2, a view taken in horizontal cross section of the haze sensor block is shown. Elements which are common to FIG. 1 are metal block 4, orifices 5, 8 and 11, filter 7 and 10, lens 12, photocells 9 and 13, and conductors 14, 15, 16 and 17. The new element is rod 26 which serves to support the sensor block. Also compression fittings 28, 29 and 30 securing light source 1 and photocells 9 and 13, respectively, are shown. Furthermore, light source 1 is depicted in one embodiment to reveal its component parts, namely lamp 2, which is secured by lamp socket 3. A preferred adaptation is to have a hinge 4b and a clasp 4c whereby discrete section 4 can be moved with respect to discrete section 4a.

Figure 3:
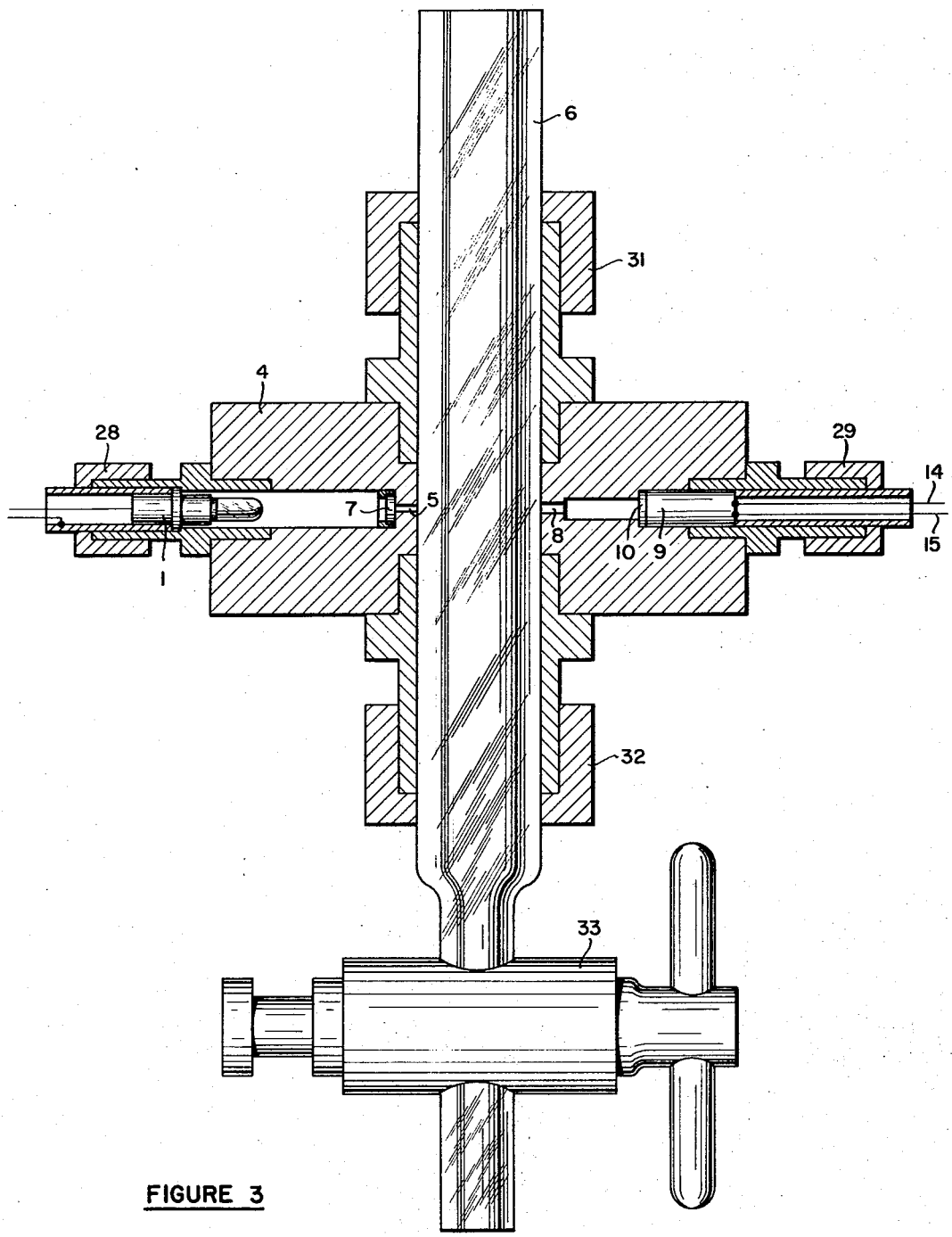
FIG. 3 is a view taken in vertical cross section of a preferred embodiment of the haze apparatus sensor block.

In FIG. 3, a view taken in vertical cross section of the haze sensor block is shown. Elements which are common to FIGS. 1 and 2 are light source 1, metal block 4, orifices 5 and 8, filters 7 and 10, photocell 9, sample tube 6, compression fittings 28 and 29, and conductors 14 and 15. New elements are compression fittings 31 and 32 which securely hold tube 6 in block 4. Also shown is stopcock 33 which allows the invention to be used for measuring a plurality of small samples. However, it is also possible that sample tube 6 be an integral part of a plant process stream and continuous measurement of such a stream would be possible under that embodiment of the invention.

In a preferred method of operation, a visually clear sample, e.g. a clear oil, is introduced into sample tube 6. The light source 1 is activated and the light from bulb 2 which is preferably type IBM No. 4, is made essentially monochromatic by placing filter 7 in its path. A highly desirable filter for this purpose is made from ¼" diameter red plastic. The light that is transmitted through the sample is attenuated by filter 10 before striking photocell 9. This photocell is preferably of a type whose resistance is inversely proportional to the light intensity striking it. A highly desirable photocell for this purpose is a cadmium sulphide photoresistive type, e.g. Clairex Model 605L. In a visually clear sample the amount of light striking photocell 9 is substantially greater than that striking photocell 13, which is of the same type as photocell 9. Therefore filter 10 is used to regulate the transmitted light intensity so that the amount of light striking photocell 9 is only slightly more than that amount striking photocell 13. It is possible to use a neutral filter for this purpose. Good results are obtained by utilizing photo negatives selected to give balance between the two photocells. In order to aid in bringing the two photocells into a relatively balanced position, it is very desirable to introduce lens 12 into a position between the sample tube to concentrate scattered light onto photocell 13. A reading can now be taken by balancing the two arms of the potentiometer which is accomplished by sliding conductor 24 along resistance wire 23 until the null point is obtained on ammeter 21, e.g. a 100 microampere meter.

The sample tube is cleaned and then refilled with a standard extremely hazy sample. A second reading is then obtained in the same manner as described above. All subsequent readings for other samples can then be evaluated with respect to the two readings taken on the clear sample and the extremely hazy sample.

The bridge circuit potentiometer circuit can be a type as shown in FIG. 1 or can be any other type including those commercially available such as an automatic recording type or an indicating type. It is also possible to use two potentiometer circuits, one being used for the zero point based on the clear sample and the other for the span derived from the hazy sample.

In order to calibrate the haze meter apparatus and evaluate the significance of the bridge circuit readings, it is necessary to point out the relationship of the photoelectric cells with the bridge circuit. After the bridge circuit has been balanced by moving sliding conductor 24 along potentiometer 23, the resistance of photocell 9 will be proportional to the distance AB on the potentiometer 23, and the resistance of photocell 13 will be proportional to the distance BC on the same wire. Since the resistance is inversely proportional to the light intensity received by the photocells, the greater the light intensity, the less the resistance. Moreover, in the bridge circuit the resistance of photocell 9 is to the resistance of photocell 13 as the length AB is to the length BC. Therefore $$\frac{R \text{ of photocell } 9}{R \text{ of photocell } 13} = \frac{AB}{BC} \text{ or } \frac{R \text{ of photocell } 13}{R \text{ of photocell } 9} = \frac{BC}{AB}$$

In the initial attenuation of photocell 9, it is desired to make an adjustment so that photocell 9 sees slightly more light than photocell 13 when both are in clear solution. Under such conditions the ratio of $BC/AB$ is adjusted so that it is more than 1, i.e. 1.5 to 30, e.g. 2 to 15. When the amount of haze increases, the amount of light seen by photoelectric cell 9 decreases; therefore, increasing the resistance of the cell; and the amount of light (scattered) seen by photocell 13 increases, therefore decreasing the resistance of photocell 13. Under such conditions as the quantity of haze increases, the ratio of $BC/AB$ becomes smaller until, finally, under extreme conditions of haze it can become as low 0.01. On the meter either calculation of $BC/AB$ can be made or direct scale readings taken.

Another satisfactory method of evaluating haze is to attenuate the light received by photocell 9 in a clear solution until the pointer of the meter 21 reads 0. The increase of haze is then the deflection of the pointer from 0.

The apparatus and method of the invention are equally operable under flow conditions as well as static conditions and, therefore, can be used in a pipe line for suitable purposes, e.g. quality control. The apparatus and method of the invention are also suitable for controlling chemical reactions. For instance, if a certain reaction product were a precipitate, its formation and rate of formation would be easily ascertainable. However, it is understood that, that portion of the pipe line used in testing under flow conditions, through which the radiant energy must pass, must be transparent to said radiant energy emitted by the energy source.

Angle α represents the angle of optimum scattering for a particular material sample. Generally, it will be within the range of about 10° to about 90°. It will, of course, be different for different materials, for example, angle α for lubricating oils will be about 20°. Therefore, in order to insure maximum sensitivity and reliability the scatter photocell should be positioned at such an optimum angle. However, use of a movable scatter photocell would detract from the ruggedness and reproducibility obtained by maintaining the scatter photocell in a rigidly fixed position. Therefore, it is within the scope of the invention to equip the sensor block with a plurality of scatter photocells at various angles relative to the transmittance photocell. In this manner, the operator may choose the scatter photocell which is seeing the maximum amount of light by switching them into the circuit and determining the one which yields a maximum value of $AB/BC$ or correspondingly minimum value of $BC/AB$.

In lieu of he filter 10 of the preferred embodiment, other attenuating means can be used such as an adjustable diaphragm, special lenses, and other materials that inhibit the transmission of radiant energy. A photocell of reduced sensitivity can be also be used instead of transmission photocell 9.

Haze as referred to herein refers to a lack of transparency or clarity in a material, which lack is often caused by the presence of optical inhomogeneities which impart a turbid appearance to transparent materials when viewed by the eye.

In general, the method of determining the relative severity of haze or optical inhomogeneities in a material comprises measuring the ratio of directly transmitted light received to scattered light received. When the ratio of directly transmitted light received to scattered light received is high, the quantity of optical inhomogeneities present in relatively small. When the ratio of directly transmitted light received to scattered light received is relatively small, the quantity of optical inhomogeneities is relatively large.

In order to determine the relative intensity of the radiant energy source passing through a medium, any electronic device which will respond to radiant energy can be used. Examples of such devices include the photoelectric cell as illustrated in the above preferred embodiment of the invention, photovoltaic cells, photoconductive cells, photoelectric tubes, photomultiplier tubes, thermopiles, bolometers, and the like.

Radiant energy as used herein refers to those wave lengths encompassing gamma rays, X-rays, the infrared, visible and ultraviolet light; that is, those electromagnetic radiations having wave lengths between 0.01 to 1,000,000 Angstroms, e.g. 100 to 1,000,000 Angstroms.

Scattered radiant energy has been used to mean radiant energy which has been caused to deviate from the direction of the incident beam by either diffraction, or reflection or refraction and/or by any combination of the three, by suspended or dispersed particles (optical inhomogeneities).

A significant advantage of the invention is that the color of the material to be evaluated for haze does not influence the ultimate haze measurement. A further advantage of this invention is that colloids and other macromolecules do not interfere with haze evaluation as often happens with other instruments such as a nephelometer.

A still further advantage of the apparatus is its portability due to the simplicity of its design and the ruggedness of its construction. The use of this invention in monitoring process streams can be enhanced by using a metal block which has been cut through along axis A—A in FIG. 2. A preferred embodiment is provided with hinges at one side and a clasp at the other side. This allows the sensor block to be fitted around a pipe line at any suitable point to monitor the contents of the stream. When desired, the block could be unclasped, removed and refitted at another suitable place.

*Example*

The sensitivity of the preferred embodiment of the haze measuring apparatus described above was tested on known concentrations of a haze standard. The results are given below:

| Haze reading [1] | Concentration of haze standard |
|---|---|
| 150 | 1.0 |
| 75 | 0.5 |

[1] An arbitrary haze sample is prepared and designated as 1.0 (concentration of haze standard). The adjustment in the electrical circuit then was made so that the meter read 150. The arbitrary sample was then diluted with an equal volume of distilled water giving a numerical figure of 0.5 (concentration of haze standard). A meter reading of 75 was then observed. This shows that the apparatus is linear since the meter reading was exactly one-half of the original reading with a concentration of the haze standard being exactly one-half of the original concentration.

As is shown by the above data, the apparatus gives a response which is in direct proportion to the concentration of the haze.

What is claimed is:
1. An apparatus for measuring haze in a material which comprises in combination:
   (a) A block having a center cavity and a plurality of passageways communicating with both exterior of the block and with said center cavity,
   (b) A source of radiant energy being positioned with respect to said block so as to transmit said radiant energy through the first of said passageways,
   (c) A first means responsive to said radiant energy, said first means being located with respect to a second of said passageways, so as to directly receive said radiant energy, said second passageway being diametrically opposed to said first passageway,
   (d) A second means responsive to said radiant energy, said second means being located with respect to a third of said passageways, said third passageway being displaced from the axis passing through the first and second passageways at a predetermined angle,
   (e) Means responsive to said first and second means to measure the relative amount of radiant energy received by said first and second means.
2. The apparatus of claim 1 wherein said first means of subparagraph (c) responsive to radiant energy has adjustable attenuating means so as to reduce the amount of radiant energy received by said first means.
3. An apparatus for measuring haze in a material which comprises in combination:
   (a) A block having a center cavity, which cavity is adapted to receive a tube of essentially annular cross section; and a plurality of passageways communicating with both the exterior of the block and with said center cavity, which passageways have an outer end of much larger diameter than their inner end,
   (b) A light bulb rigidly mounted within the outer end of a first of said passageways,
   (c) A first means responsive to light, said first means being rigidly mounted within the outer end of a second of said passageways,
   (d) A second means responsive to light, said second means being rigidly mounted within the outer end of a third of said passageways, said third passageway being displaced from the axis passing through the first and second passageways at a predetermined angle,
   (e) Means responsive to said first and second means to measure the relative amount of light received by said first and second means.
4. The apparatus of claim 3 wherein an adjustable filter is mounted between the inner end of said second passageway and said first means so as to reduce the amount of light received by said first means.
5. The apparatus of claim 3 wherein said first and second means responsive to light comprise photocells.
6. The apparatus of claim 3 wherein said means responsive to said first and second means is a potentiometer.
7. The apparatus of claim 3 wherein a filter is mounted between the inner end of said first passageway and said light bulb so as to transmit essentially monochromatic light.
8. An apparatus for measuring haze in a material which comprises in combination:
   (a) A block having a center cavity, which cavity is adapted to receive a tube of essentially annular cross section; and a plurality of passageways communicating with both the exterior of the block and with said center cavity, which passageways have an outer end of much larger diameter than their inner end,
   (b) A light bulb rigidly mounted within the outer end of a first of said passageways,
   (c) A first means responsive to light, said first means being rigidly mounted within the outer end of a second of said passageways,
   (d) Said block characterized by two discrete sections, said sections being contiguous along a plane perpendicular to the planes passing through said first and second pasageways and said sections being hinged for adjusting the position of said sections with respect to said tube, (e) A second means responsive to light, said second means being rigidly mounted within the outer end of a third of said passageways, said third passageway being displaced from the axis passing through the first and second passageways at a predetermined angle, (f) Means responsive to said first and second means to measure the relative amount of light received by said first and second means.

References Cited

UNITED STATES PATENTS

| | | | |
|---|---|---|---|
| 1,971,443 | 8/1934 | Exton | 88—14 |
| 2,100,934 | 11/1937 | Berges | 250—231 |
| 2,280,993 | 4/1942 | Barnes | 88—14 |
| 2,464,211 | 3/1949 | Cahusac et al. | 250—218 |
| 2,501,599 | 3/1950 | Eltenton et al. | 88—14 |
| 2,590,827 | 3/1952 | Stamm et al. | 88—14 |
| 2,873,644 | 2/1959 | Kremen et al. | 250—218 |
| 2,920,525 | 1/1960 | Appel et al. | 250—218 |

ARCHIE R. BORCHELT, *Primary Examiner.*

WALTER STOLWEIN, RALPH G. NILSON, *Examiners.*

M. ABRAMSON, *Assistant Examiner.*